United States Patent [19]
Shook et al.

[11] Patent Number: 5,416,727
[45] Date of Patent: May 16, 1995

[54] MOBILE PROCESS MONITOR SYSTEM FOR KILNS

[75] Inventors: William B. Shook, Columbus; Dennis R. Pugh, Galena; Karl W. Olson, Worthington, all of Ohio

[73] Assignee: American Ceramic Service Company, Columbus, Ohio

[21] Appl. No.: 991,285

[22] Filed: Dec. 15, 1992

[51] Int. Cl.$^6$ .......................................... G01K 13/10
[52] U.S. Cl. ................. 364/557; 364/551.01; 364/503; 364/473; 340/584; 432/32; 34/528
[58] Field of Search ............... 364/557, 503, 551.01, 364/505, 472, 475, 424.02, 422; 73/146.4, 146.5; 340/602, 601, 584, 870.17, 870.31, 870.32; 432/24, 32, 45; 374/179, 170, 42; 34/46, 48, 26, 30, 528, 535, 537, 543–545

[56] References Cited

U.S. PATENT DOCUMENTS

| | | | |
|---|---|---|---|
| 3,300,196 | 1/1967 | Bendy | 364/503 |
| 3,662,861 | 5/1972 | White et al. | 187/29 R |
| 3,713,124 | 1/1973 | Durland et al. | 340/870.31 |
| 4,176,554 | 12/1979 | Kazmierowicz | 73/341 |
| 4,356,641 | 11/1982 | Rosenau | 364/503 |
| 4,363,137 | 12/1982 | Salisbury | 455/40 |
| 4,428,782 | 1/1984 | Walker et al. | 148/129 |
| 4,447,805 | 5/1984 | Omae et al. | 340/870.17 |
| 4,716,411 | 12/1987 | Nakamura | 340/870.17 |
| 4,749,993 | 6/1988 | Szabo et al. | 340/870.31 |
| 4,772,439 | 9/1988 | Trevino-Gonzalez | 34/46 |
| 4,817,049 | 3/1989 | Bates et al. | 364/422 |
| 4,839,644 | 6/1989 | Safinya et al. | 340/854 |

OTHER PUBLICATIONS

Promotional material for Bricesco Pyrotrace mobile data acquisition system for tunnel kiln.
Promotional material for Kil-Tel real-time kiln diagnostic system.
Promotional material for Kil-Tel AEL Telemetry Transmitter.
Promotional material for Datapaq Kiln Tracker System.
D. Plester, "Kiln Tracker Results in Major Savings in Sanitaryware Sector."
Kiltel Price List 91–1, Phoenix Consulting Service.
Promotional material for Grant Squirrel System oven temperature recording system, Science/Electronics, Jul. 1989.
Promotional material for Grant temperature recording systems for conveyor ovens, Science/Electronics, Jul. 1989.
Price list for oven temperature recorders, Science/Electronics, Jan. 1, 1992.
R. J. Schorr and D. Fronk, Monitoring the Firing Process, ACS Bull., vol. 179 Sep. 1991 p. 1751.
C. J. Hudson, A Study of the Operation of a Dressler Tunnel Kiln, Journal Amer. Ceram. Society, vol. 4 Sep. 1921 pp. 738–754.
G. Geiger, Firing Structural Clay Products with Improved Productivity, ACS Bull. vol. 71 Dec. 1992 pp. 1759–1765, 1835.
T. Root, Ochs Brick Company-Efficient Production with Automation ACS Bull. vol. 71 Aug. 1992 pp. 1205–1207.
No Author, Plant Report–Fireline, Inc.—A Commitment to Automation, Amer. Ceram. Soc. Bull., vol. 72, Jul. 1993, pp. 37–39.
E. Rowden, R. J. Waller & M. Francis, An Investigation of the Temperature Schedule of a Tunnel Kiln Firing Biscuit Wall Tiles, Transactions of the British Ceramic Society, vol. 45, No. 1, 1946 pp. 1–33.
W. H. Holmes, New Methods of Studying Kilns, The A.T. Green Book 1959 pp. 130–141.
Harrison & Son, Hanley, Stoke–on Trent, England, Seger Cones, What They Are and How to Use Them in Controlling the Temp. of Kilns etc., no date pp. 1–3.

Primary Examiner—Emanuel T. Voeltz
Assistant Examiner—Hal D. Wachsman
Attorney, Agent, or Firm—Standley & Gilcrest

[57] ABSTRACT

An industrial mobile process monitoring system is described which provides a way by which a measurable atmospheric condition, such as temperature, can be measured in real time at a plurality of different locations in a structure such as a kiln, and the information transmitted to a base station computer via magnetic energy linking primary and secondary windings of an air-core transformer.

10 Claims, 17 Drawing Sheets

PRECISION
VOLTAGE REFERENCE

ICE POINT/ZERO VOLTAGE REFERENCE

LOW-LEVEL VOLTAGE REFERENCE

INSTRUMENTATION AMPLIFIER

BATTERY MONITOR CIRCUIT

HIGH-LEVEL ANALOG
MULTIPLEXER

ANALOG-TO-DIGITAL CONVERTER

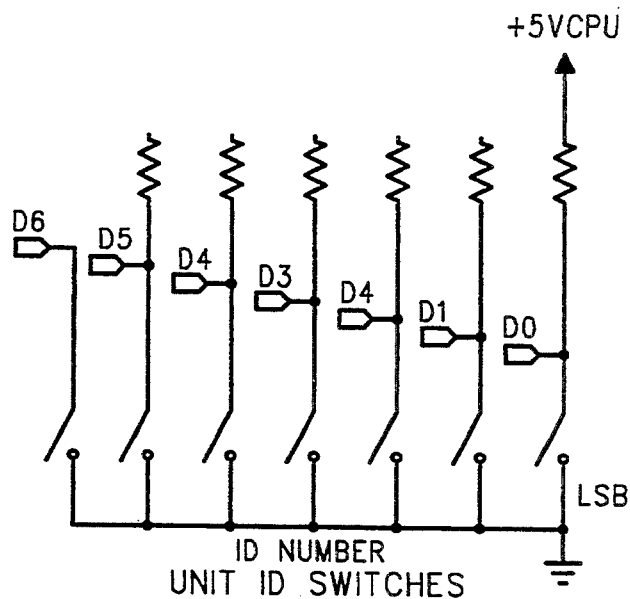
FIG. 8J
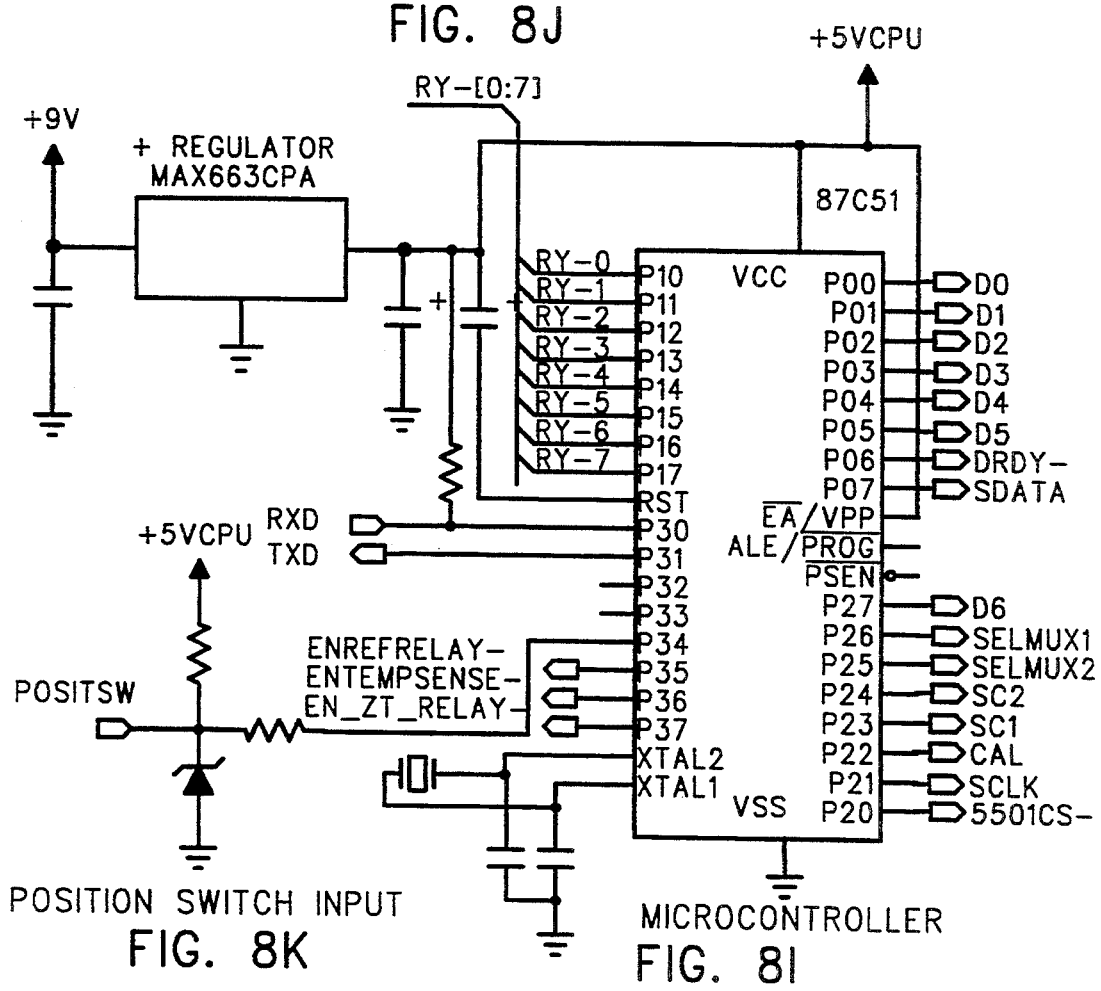
FIG. 8K
FIG. 8I

SQUARE WAVE OSCILLATOR

ON-OFF MODULATOR/BRIDGE CONTROLLER

FOUR-QUADRANT POWER BRIDGE

TRANSIENT PROTECTION CIRCUITRY

BAND-PASS FILTER

AM DEMODULATOR

ON-OFF THRESHOLD DETECTOR

MOBILE PROCESS MONITOR SYSTEM FOR KILNS

BACKGROUND AND SUMMARY OF THE INVENTION

The present invention relates generally to a system for monitoring the temperature within a kiln, and more particularly, to a system for measuring the temperature at a plurality of different locations on moving kiln cars.

Kilns have long been used in the manufacturing of ceramic articles. Just a few examples of the many articles (ware) that are made with the use of kilns are tiles, bricks, refractories, china, earthenware, electrical porcelain items, spark plugs, toilets, and bathroom sinks just to name a few. Products such as these are placed in a kiln to be baked or fired by temperatures far in excess of 1,000 degrees centigrade. Kilns in use today around the world come in various shapes and sizes to serve production needs of particular articles. For example, tunnel kilns can be in excess of 100 feet long having a track running through them for conveying multiple cars of articles to be fired in a mass production environment, while shuttle kilns have cars full of articles to be fired, moved into the kiln one at a time.

It is desirable to be able to monitor atmospheric conditions, such as temperature, carbon monoxide levels, oxygen levels, $CO_2$ levels, humidity or water vapor levels, and sulphur oxide levels, inside of a kiln, at different locations or zones within the kiln, in order to optimize the firing process. High temperature thermocouples acting as temperature transducers may be used. Specifically, it is desirable to monitor the temperature in and around the articles or objects being fired.

In a tunnel kiln the objects being fired are in continuous motion though the kiln making it difficult to monitor the temperature in and around the moving objects. A plurality of cars carrying the articles to be fired, move on tracks through the kiln. Because the articles to be fired are resting on top of the cars, and since it is the object of the kiln firing process to fire the articles, it is not essential to heat the zone of the kiln in the vicinity under the cars. Therefore, this area is maintained at a much lower temperature than the firing regions above the car beds or decks. The underside of the cars are also somewhat insulated from the heat existing above the car beds due to the fact that the cars are often in end-to-end contact and heat seals may be placed on the sides of the deck of each car in close relation to the walls of the tunnel kiln. This can greatly reduce the underside temperature. However, the temperature under the cars can still reach a level up to 200 degrees Celsius.

It is known to use thermocouples to transmit temperature data to the exterior of a kiln. Some approaches have used either a data logger or a telemetry device to transmit the temperature data. A disadvantage of using a data logger is that the temperature data is not available until after the car exits the kiln. This precludes real time analysis and adjustment of the temperature within the kiln. Telemetry units also suffer from disadvantages. One is the fact that many tunnel kilns are made of steel which is not especially conducive to radio transmissions. Industrial radio telemetry links usually tend to be quite expensive. Additionally, because kilns are used in a variety of countries a radio-based telemetry link may face governmental regulation on the frequencies that could be emitted. A need exists for a real time temperature monitoring system for measuring, transmitting, and receiving temperature data from a variety of locations within a kiln.

The present invention may be applied to measure temperature and temperature distribution within a setting of articles being fired in a tunnel kiln or a shuttle kiln. The temperature data received will allow variation of operating processes by an operator of a kiln to reduce undesired gradients or otherwise to correct for temperatures which are either above or below the desired firing schedule. Two commonly used firing procedures are generally known as "continuous" and "periodic". Tunnel kilns and shuttle kilns, respectively, are associated with these firing procedures.

Tunnel kilns typically have a railed track much like a railway system. Cars which will carry the articles to be fired move on wheels over these tracks. A temperature profile is maintained in the space above the decks of the cars such that the entrance end and the exit end of the tunnel are at a much lower temperature than the center of the length of the tunnel. The cars generally move rather slowly through the kiln so that the articles atop each car experience a gradual rise in temperature to a maximum level which is subsequently lowered as the articles near the exit of the kiln.

Periodic firing was the more common method of kiln usage in the past. Under the periodic method the kiln is filled with ware, fired to its maximum temperature, cooled, and then unloaded. The drawback with this process is that major energy losses accompany it as compared to thermal efficiencies which are achieved under continuous firing. Several advantages do exist however, for periodic firing. These include the flexibility in production scheduling, variation in size and shape of the ware which may be accommodated, atmospheric and temperature control being more manageable, and improved thermal design efficiencies. More modern methods of periodic firing make use of shuttle cars to rapidly remove one or more cars from a kiln and place another car(s) to be fired into the kiln.

Thermocouples used to monitor the temperature at various locations within a kiln must be situated so as not to interfere with the passage of articles in the tunnel kiln, or with the insertion/removal of articles from a shuttle kiln. It would be advantageous to have temperature measurement throughout the setting of the articles being fired, such as at a point deep within a stack of ware, near the insulating deck of a car, close to the top of the setting of the ware between articles, and from side to side of the setting. The present invention is designed to accomplish such detection while the articles being fired go through the thermal process within the kiln.

Modern firing technology within a kiln is directed to the goal of optimum use of energy to achieve the desired fired properties for the articles. Detailed familiarity with the chemical and physical behavior of the ceramic material being processed is very beneficial to computing the optimum use of energy. Most ceramics undergo complex chemical reactions commensurate with their composition, thermal and gaseous exposure time. Heating often causes the decomposition or oxidation of mineral constituents with the evolution of gases and/or significant changes in physical size and bonding strength. Chemical reactions stimulated by intimate contact of the reactant particles at high temperatures generally create new compositions, some of which become liquid. The densification and strength development is usually accompanied by shrinkage and a reduction in the ability of the material to transport gases to and from the reaction sites within the ware. Temperature gradients imposed by the difficulties of heat penetration throughout the ware setting can result in variations in the fired properties of ware from different locations within the setting. Even worse, there may be bloated, cracked or warped ware as a result of such gradients, or strains which show up only in later service as spontaneous cracking.

The cooling phase can be disastrous to fired ware, since the material is now rigid and generally behaves in a brittle fashion. Thermal gradients accompany the cooling process, so there are thermal strains generated within the ware due to differential shrinkages. Some mineral constituents undergo rapid phase changes over narrow temperature regions, often associated with relatively large change of physical size. If such materials are subjected to temperature changes which are too rapid, they will generate major failure cracks during the cooling.

The above considerations lead to the design of firing and cooling curves, including "soak" times at constant temperature, which will result in the maximum production of first quality finished articles in the minimum time with the least amount of fuel for the firing process. To help attain these goals a detailed knowledge of temperature variations throughout the ware setting may be obtained so that processing techniques may be introduced to minimize such variations and their effects. Many modern burner systems utilize pulse firing and/or high velocity hot gases directed to the elimination of gradients. Variations in patterns of ware setting may be developed to alleviate some of these problems. Limits on the rate of heating are often established on the basis of unavoidable gradients. Whatever method is used, it is required that temperature measurements or other means of detection of thermal gradients be utilized to best accomplish these goals. With temperature data available during the firing process it is possible to directly observe influences of adjustment which are made. The present invention offers a system by which this result is achieved.

The present invention comprises non-contacting transmission of data from a remote location, such as under a kiln car, to a base station which may be located at any convenient site within a factory, via a magnetic coupling which may operate with negligible radiative output. The present invention comprises a plurality of thermocouples, signal conditioning electronics, a phase-change type thermal enclosure, a telemetry link using a nonradiating magnetic coupling, and a data display/recording device located external to the kiln.

The car mounted electronics package of the present invention includes thermocouple signal conditioning electronics. The resulting signals are converted into digital form and are read by a microcontroller. The microcontroller communicates with the base station via a special telemetry link. The base station is the other end of the telemetry link which may include a personal computer. Software on the base station computer may provide for the display and storage of the temperature data. The base station may be capable of communicating with many cars on a time-multiplexed basis.

The connection from the microcontroller to the base station computer may be an RS-232 format serial communications link preferably capable of operating at around 300 baud or greater. Each end of the telemetry link may contain both a transmitter and a receiver.

The transmitter and receiver are linked by an air core signal transformer of the present invention comprised of loops of wire which are arranged in such a way as to obtain good magnetic coupling between the base station and the mobile sensor unit(s). In a tunnel kiln application, the signal transformer winding may comprise several turns of wire wrapped around the perimeter of the car. The base station signal transformer winding (STW) may comprise a wire which is routed in a straight path through the tunnel kiln near one of the tracks, returning in a straight path near the other track. The transmitter may comprise a square wave oscillator which transmits when the RS 232 input signal is at logic one, and is idle when the input is at logic zero. The receiver may comprise a preamplifier and an AM demodulator circuit. A plurality of cars may use the same frequency under a software handshaking protocol, with the base station acting as the master. The telemetry link is that of an air-core transformer.

Other objects and advantages of the present invention will become more apparent upon consideration of the following detailed specification and drawings.

DESCRIPTION OF PREFERRED EMBODIMENT(S)

Figure 1:
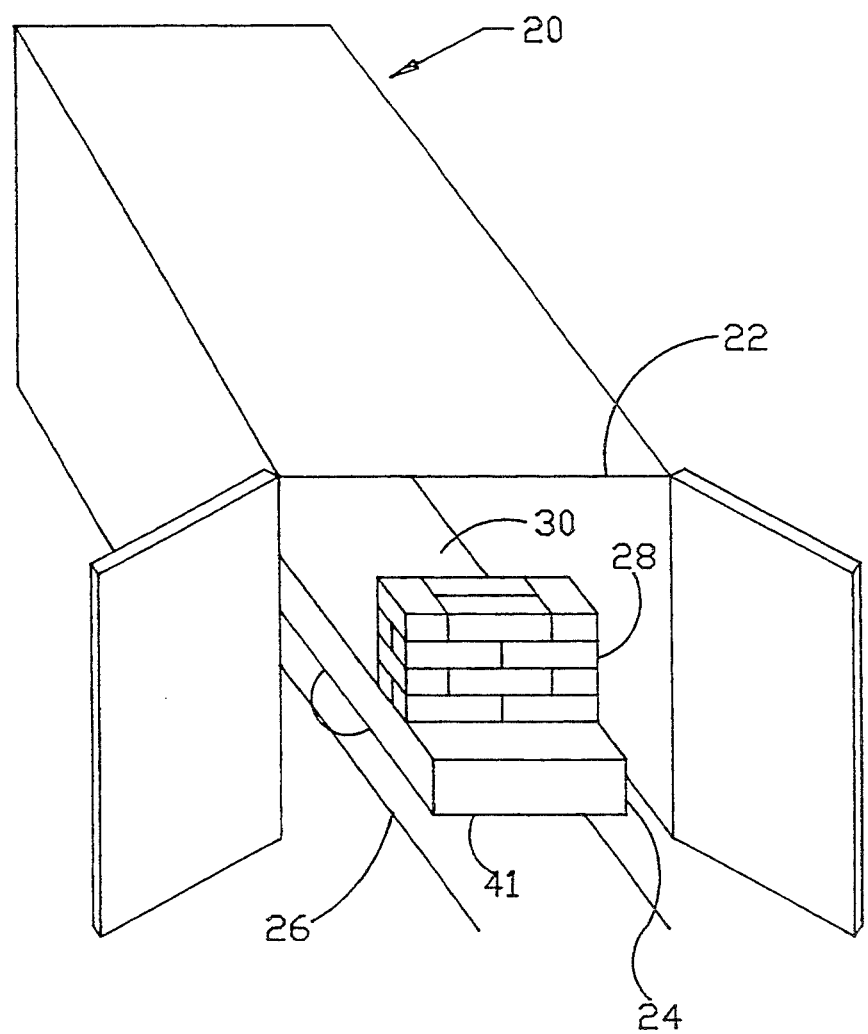
FIG. 1 is a perspective view of an entrance to a tunnel kiln with a loaded car about to enter the kiln.

Referring now to FIG. 1, there is shown a tunnel kiln 20 entrance 22 for receiving a car 24 movable on a track 26. The car 24 is loaded with articles 28 to be fired in the kiln 20. The articles 28 rest on the deck 30 of the car 24. The railroad-like tracks 26 pass longitudinally through the tunnel of the kiln. The interior of the tunnel of the kiln is adapted to generate very high levels of heat to fire or bake the articles that pass through the kiln.

Figure 2:
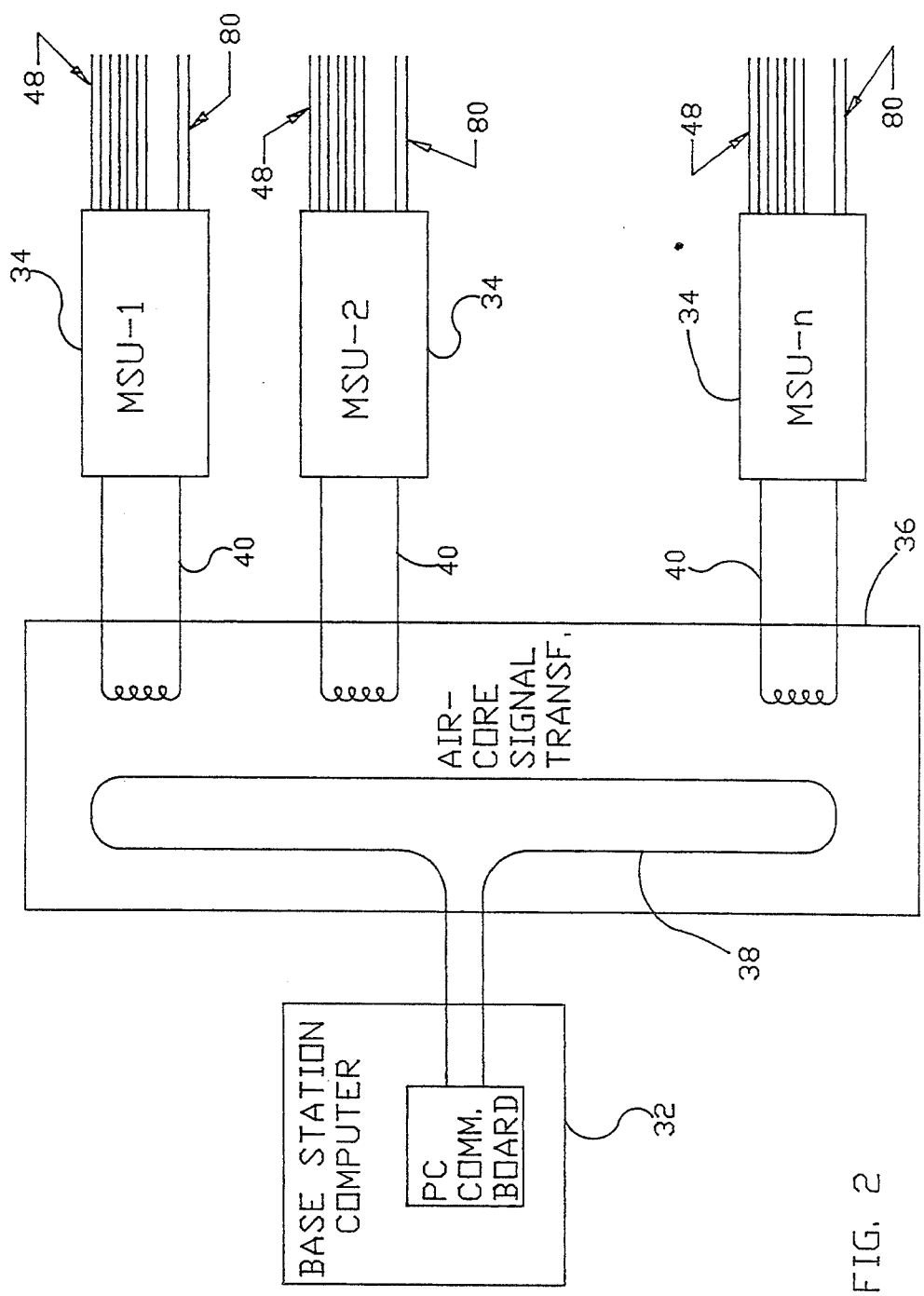
FIG. 2 is a schematic block diagram of the overall system of the present invention.

Referring to FIG. 2, the present invention comprises three major subsystems: a base station computer 32; mobile sensor units 34; and an air-core signal transformer 36 used as the communication link between the base station 32 and the mobile sensor units (MSU's) 34. The present invention provides a means by which the temperature at a plurality of different points on each of a plurality of moving kiln cars, can be measured, transmitted to a fixed computer, may be displayed graphically, and the data stored for later analysis. Provision may also be made to detect when each kiln car moves past a certain location.

The air-core signal transformer inputs include a primary winding 38 connected to the base station computer and secondary windings 40 connected to the MSU's. The air-core signal transformer outputs include a primary winding connected to a base station computer and secondary windings connected to the MSU's. Communication between the computer and the MSU's is established via magnetic energy linking primary and secondary windings of the air-core signal transformer. The transformer may be designed to operate efficiently at a selected excitation frequency, such as 20 kHz. Since the physical dimensions of the transformer windings are negligibly small relative to the wave length of the excitation source, negligible electromagnetic radiation is produced.

Referring particularly to the transformer primary winding it may have as its inputs an on-off modulated electrical excitation from the base station computer and magnetic flux from the secondary windings. The outputs may include an on-off modulated voltage to the base station computer and magnetic flux to the secondary windings. The primary winding in a preferred embodiment of the present invention consists of a single turn loop of wire. The loop is formed by running a conductor through the kiln beneath the kiln cars, but above the floor of the kiln and parallel to the tracks inside the kiln. Preferably the wire runs parallel to one side 42 of the track until it reaches an end of the kiln-and there it forms a loop to the other side 44 of the tracks and follows the other track rail, running parallel to it, back through the kiln on the opposite side of the first pass of the wire. The resulting loop of wire 38 is preferably oriented horizontally. The wire may be supported by a variety of different support means such as insulator posts 46 secured to the floor.

The secondary windings of the transformer have as inputs an on-off modulated electric excitation from individual MSU's, and magnetic flux from the primary winding. The outputs of the secondary windings include the on-off modulated voltage to individual MSU's, and magnetic flux to the primary winding. Preferably one multiple-turn secondary winding 40 is installed around the bottom periphery 41 of each of the MSU-equipped cars. This winding preferably has the same horizontal orientation as the primary winding.

Figure 7:
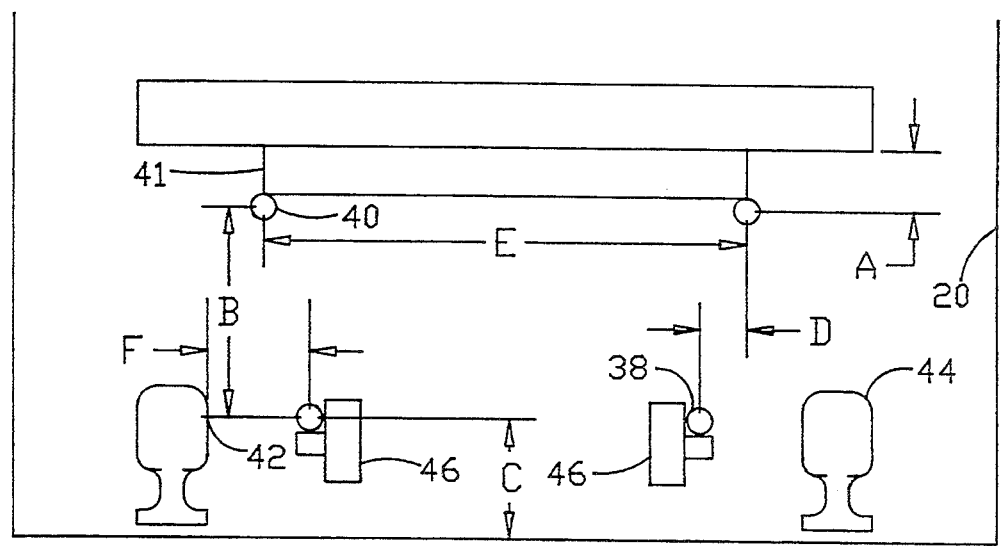
FIG. 7 is a schematic representation of an air-core transformer of the present invention.

Referring to FIG. 7, the transformer coil geometry for a given kiln may preferably incorporate the following relationships:

B is less than or equal to E/10;
A is greater than or equal to B/2;
C is greater than or equal to B/2;
the absolute value of D is less than or equal to B; and
the absolute value of F is greater than or equal to B/2.

The electronics assembly mounted on the cars in one embodiment does not contain provisions for matching the impedance of the secondary coils. Thus the number of turns of each secondary coil is chosen to make the inductance of the coil approximately one millihenry. The inductance of a round air-core coil with a diameter very much greater than its length is approximately determined by the equation:

$$L = 3.585 * N^2 * D \, MICROHENRIES$$

In the equation N is the number of turns and D is the diameter of the coil in meters. The inductance of a rectangular loop can be approximated from this equation, thus given the loop diameter and the specified inductance, the appropriate number of turns N can be computed.

The base-station computer has as its physical input the air-core transformer primary winding, and as its data input, the messages transmitted thereon. The output of the base station computer includes the graphical and numerical temperature data in human readable form, temperature data files, and its physical output is the air-core transformer primary winding. The base-station computer may be programmed to graphically display temperature data in real time, and store data for later analysis.

The temperature data is obtained from each of the MSU's. The base-station computer communicates with the MSU's preferably using a serial data protocol over the air-core signal transformer. The base-station may act as a moderator, commanding each of the MSU's to transmit only when specifically requested by the base-station. This would result in no more than one winding of the air-core transformer being driven at any given instant.

The base-station computer preferably comprises an industry standard architecture (ISA) personal computer (PC), application software to implement the functionality described above, and a PC communication board. The inputs to the PC communication board may include on-off modulated serial data from the air-core transformer and the ISA bus data and control. The outputs from the communication board would include on-off modulated serial data to the air-core transformer and ISA bus data and control. The communication board provides the base-station PC with the ability to communicate over the air-core signal transformer to the MSU's.

Figure 6:
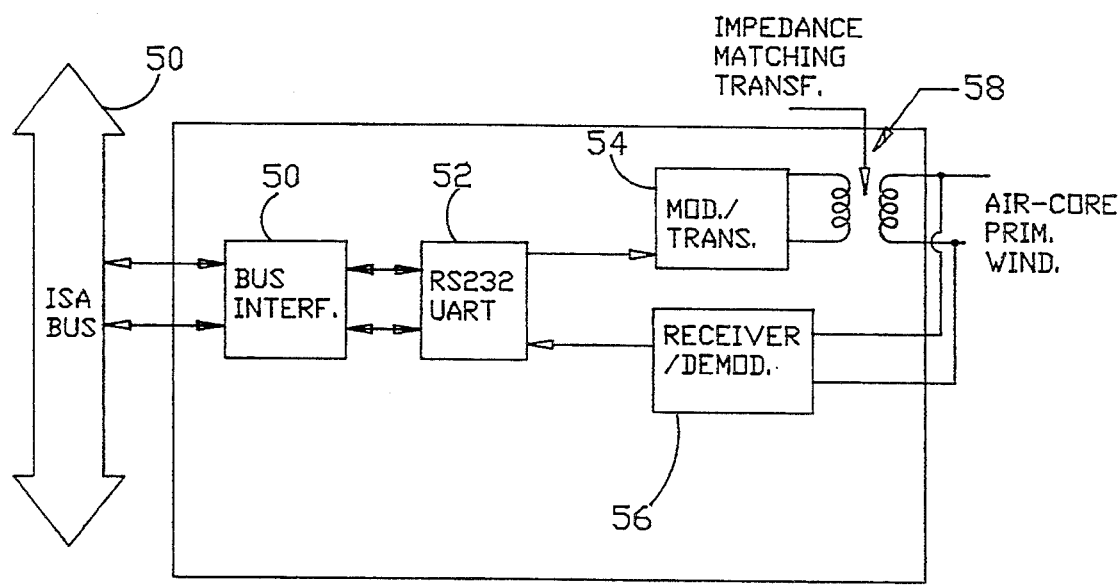
FIG. 6 is a schematic block diagram of a personal computer communication board for use with the present invention.

As shown in FIG. 6, the communication board preferably comprises five functional blocks of circuitry: a standard bus interface circuit 50; an RS 232 UART standard circuit 52; a modulator/transmitter 54; a demodulator/receiver 56; and an impedance-matching transformer 58 which may be used to step-down the drive voltage from the base station transmitter prior to being applied to the primary coil. Without this transformer the primary coil current would be excessively high due to its low inductance.

Figure 3:
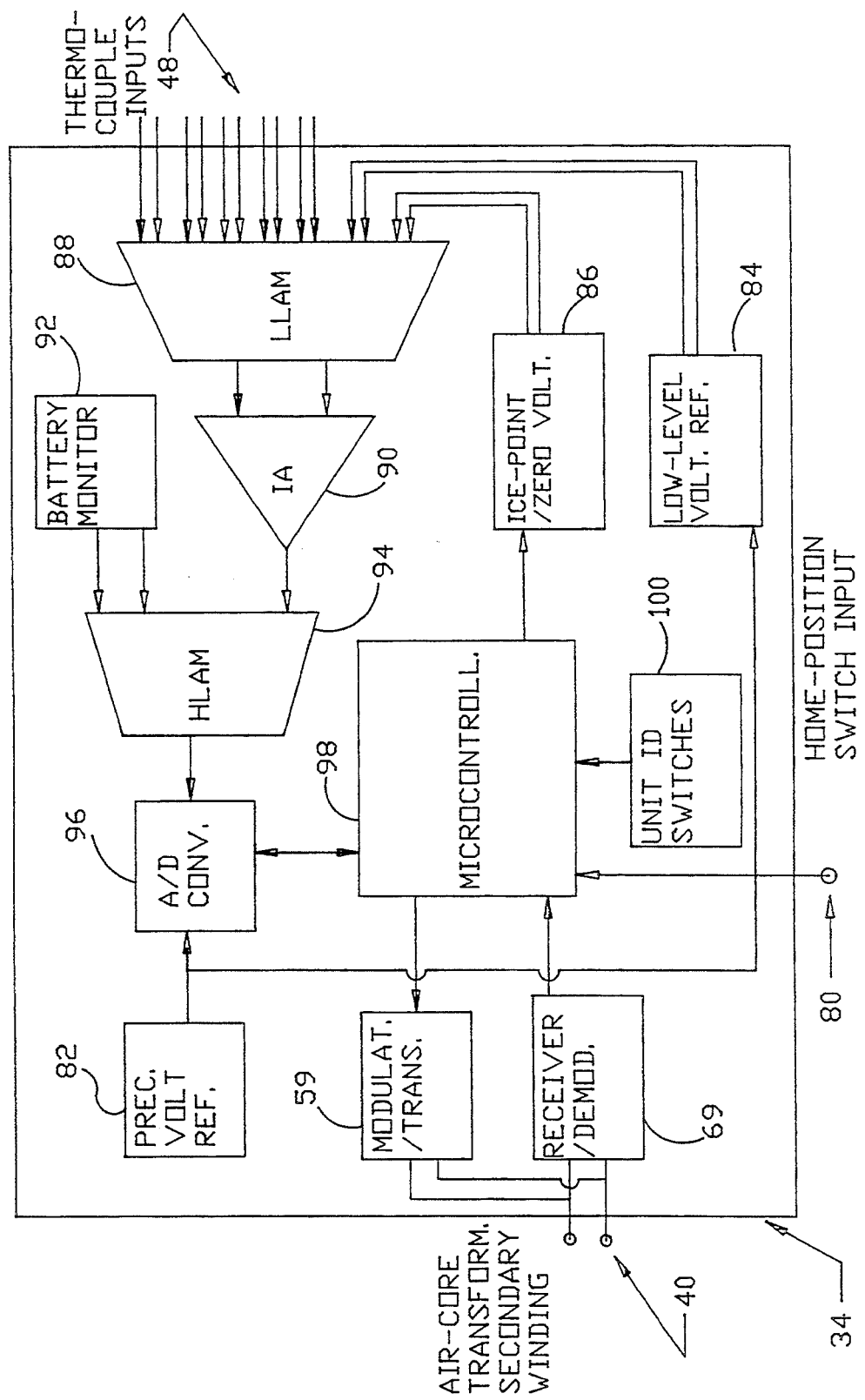
FIG. 3 is a schematic block diagram of a mobile sensor unit of the prevent invention.

As shown in FIG. 3, each mobile sensor unit of the present invention preferably has several inputs from a plurality of thermocouple 48 connections, a kiln car home position switch 80, and the air-core transformer secondary winding 40. The output of each mobile sensor unit would preferably be the air-core transformer secondary winding. The MSU's are attached to the underside of the kiln cars, preferably in temperature regulated enclosures. The MSU's preferably contain the circuitry necessary to amplify the thermocouple signals 48, convert them to digital format, and transmit the digital information to the base-station computer upon command. In one preferred embodiment of the present invention each MSU comprises up to fourteen functional blocks of circuitry which are described hereinafter.

Figure 8A:
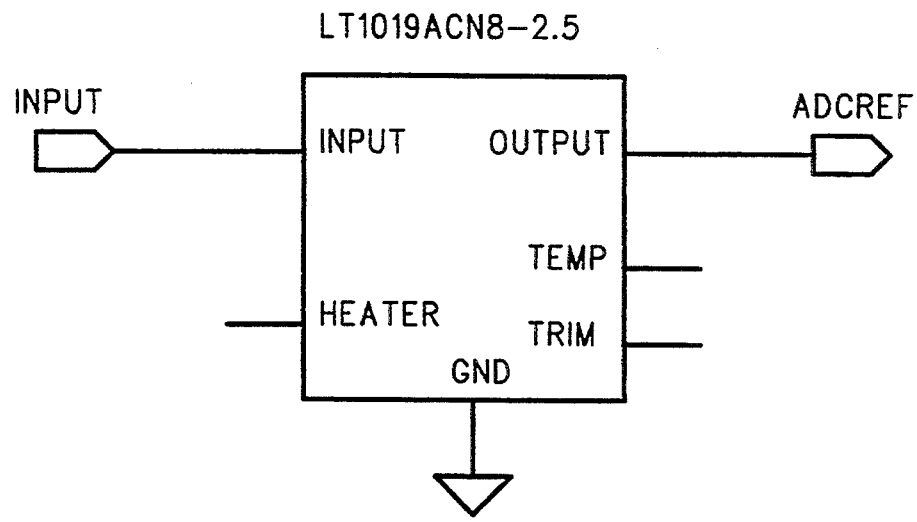
FIGS. 8 A-R are electrical circuit diagrams of components of the present invention.

Each MSU would preferably have a precision voltage reference 82 (also shown in FIG. 8A). This is a highly stable circuit which produces a precise DC voltage under all conditions. The absolute accuracy of the precision reference voltage determines the accuracy of the overall system. All other significant sources of error may be removed through self-calibration procedures.

Figures 8B, 8C:
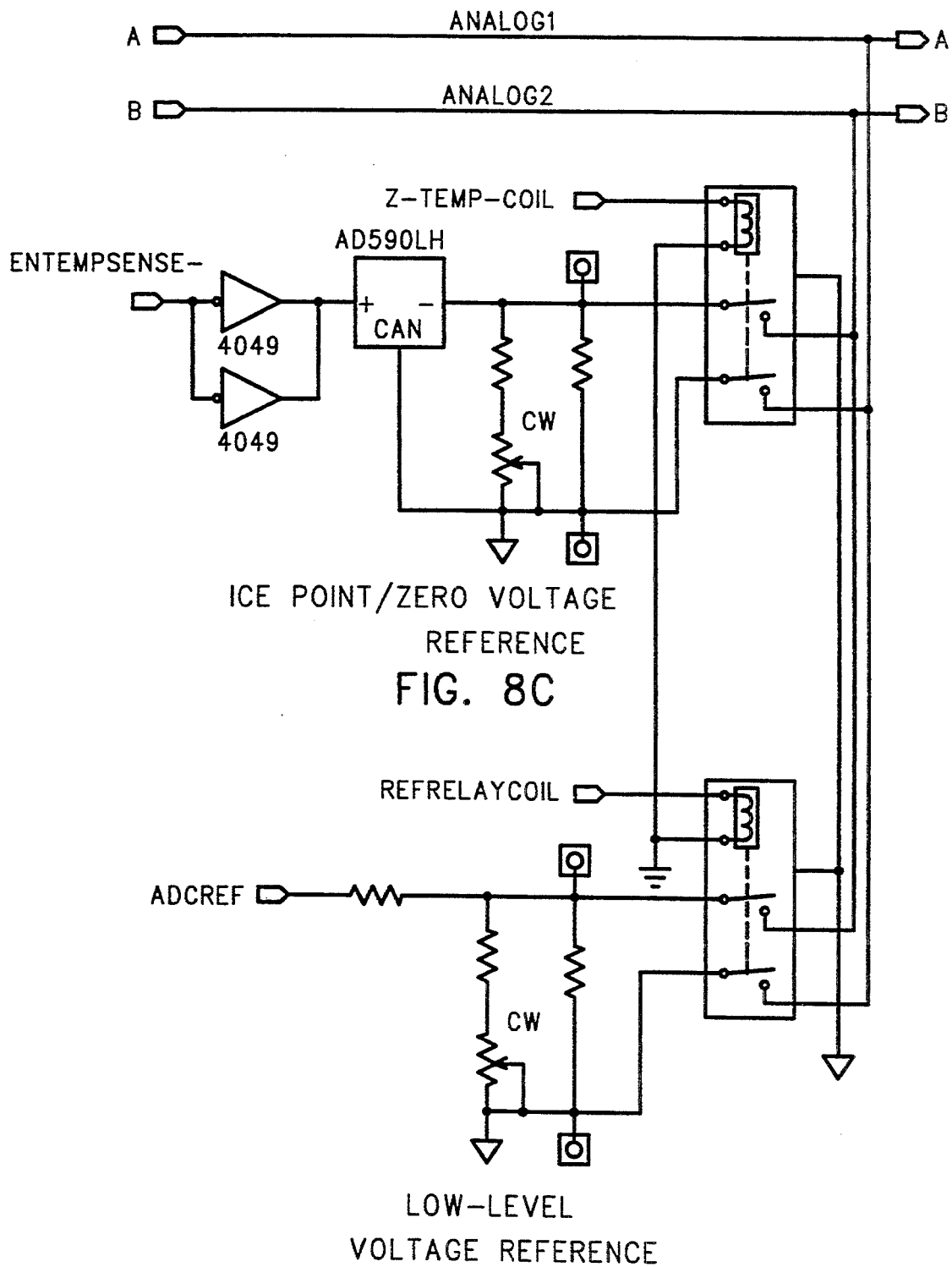

Each MSU would preferably contain a low level voltage reference circuit 84 (also shown in FIG. 8B). This circuit reduces the precision reference voltage to a value which is comparable to thermocouple output voltages. It can be input to the instrumentation amplifier circuitry and used to calibrate the amplifier and analog-to-digital converter.

Each MSU would preferably have an ice-point/zero-voltage reference 86 (also shown in FIG. 8C). This circuit serves two functions. First, it preferably contains a precise electronic thermometer which is used to measure the temperature inside the electronics enclosure. This information is used to compute absolute thermocouple temperature. The basic thermocouple circuitry may only measure the thermocouple temperatures relative to the temperature inside the electronics enclosure. The second function of this block of circuitry is the capability to command the electronic thermometer to turn off its output which results in zero volts being output. This voltage can be input to the instrumentation amplifier and used to calibrate the instrumentation amplifier and the analog-to-digital converter.

Figure 8D:
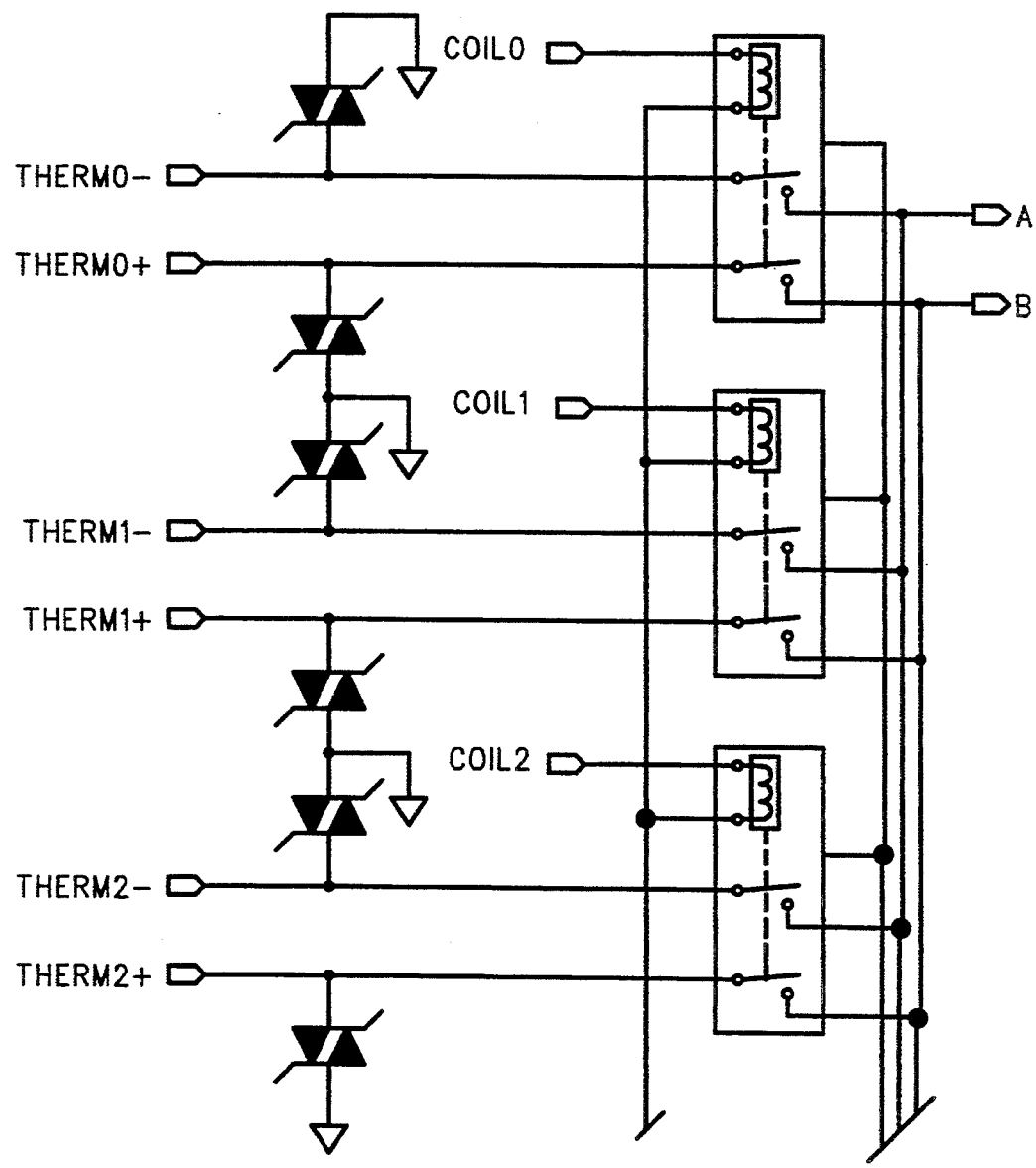

Each MSU would preferably include a low level analog multiplexer 88 (also shown in FIG. 8D). The circuit of the multiplexer would preferably be of conventional design and used to connect any one of the low level voltage inputs (from the thermocouples, the low level voltage reference, and the ice point/zero voltage reference) to the instrumentation amplifier. The multiplexer may be a differential type constructed of reed relays. An alternative design is to provide separate amplifiers for each signal, then use a high level, solid state analog multiplexer. Inputs of this block of circuitry are connected to the instrumentation amplifier as commanded by the microcontroller.

Each MSU may further include a thermocouple fault detection means which allows the MSU to automatically detect any disconnected or broken thermocouples. A low level voltage reference circuit may be connected in parallel with each thermocouple input. When a voltage is applied to the circuit, if a thermocouple is broken, the resulting voltage will be equal to the low level voltage reference.

Figure 8E:
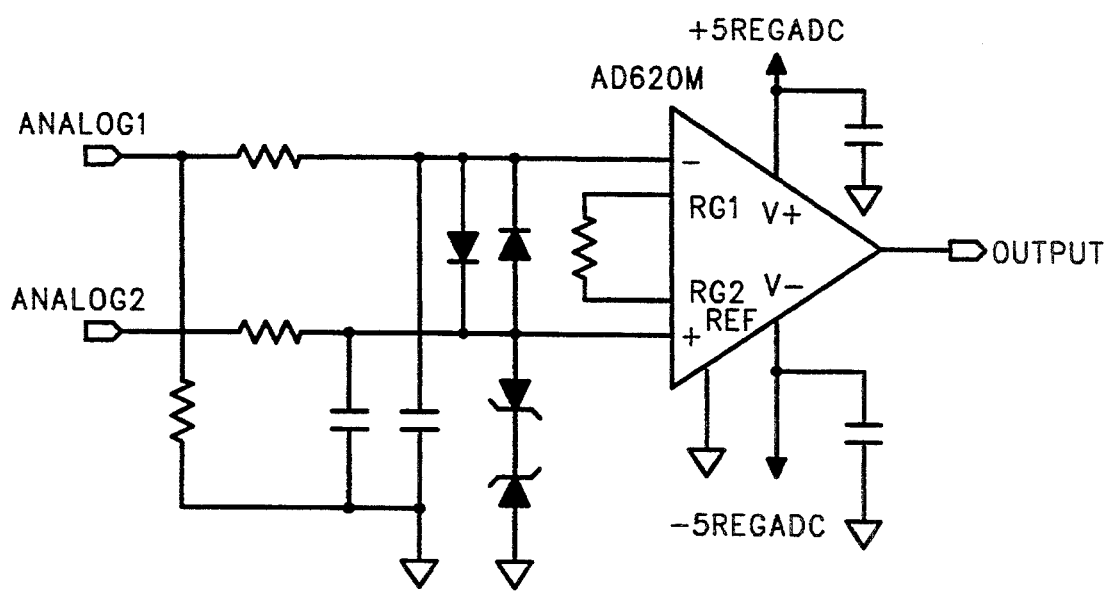

Each MSU preferably includes an instrumentation amplifier 90 (also shown in FIG. 8E). This circuit may be of conventional design, to amplify small voltages (such as those generated by thermocouples) to a level which is compatible with the analog-to-digital converter input. It is preferably a differential type amplifier, which means that potential error sources (such as electromagnetic radiation) which cause equal error voltages to appear on both thermocouple leads will not cause measurement errors.

Figure 8F:
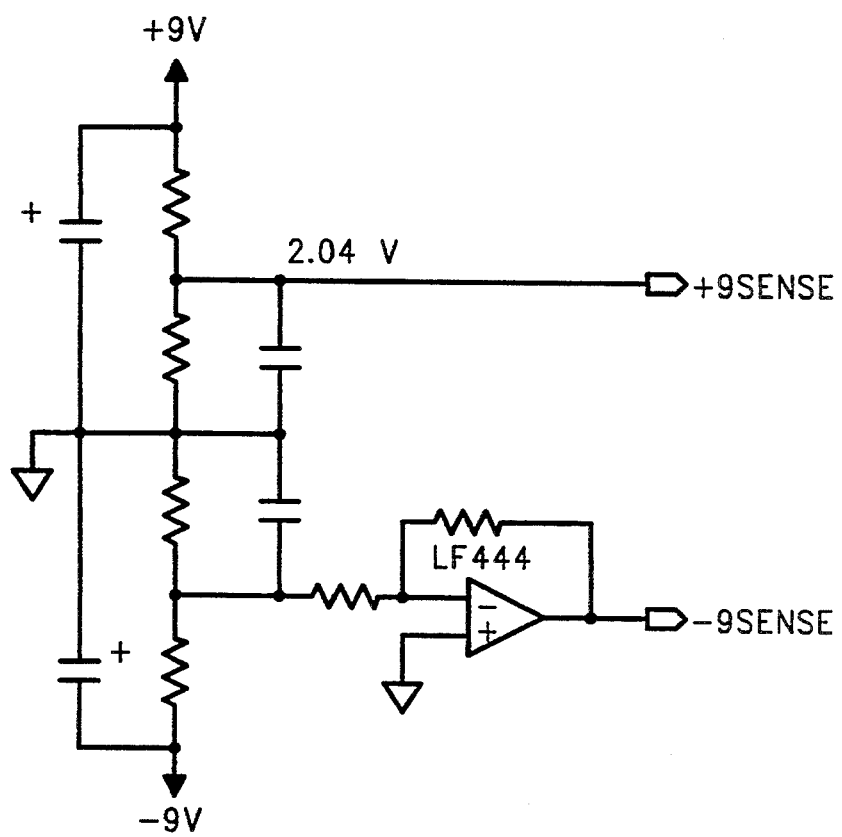

Each MSU preferably includes a battery monitor circuit 92 (also shown in FIG. 8F). The circuit converts voltages from the two power supply batteries to levels which are compatible with the analog-to-digital converter. This allows the microcontroller to monitor the battery voltages and issue warnings before the batteries become fully discharged.

Figure 8G:
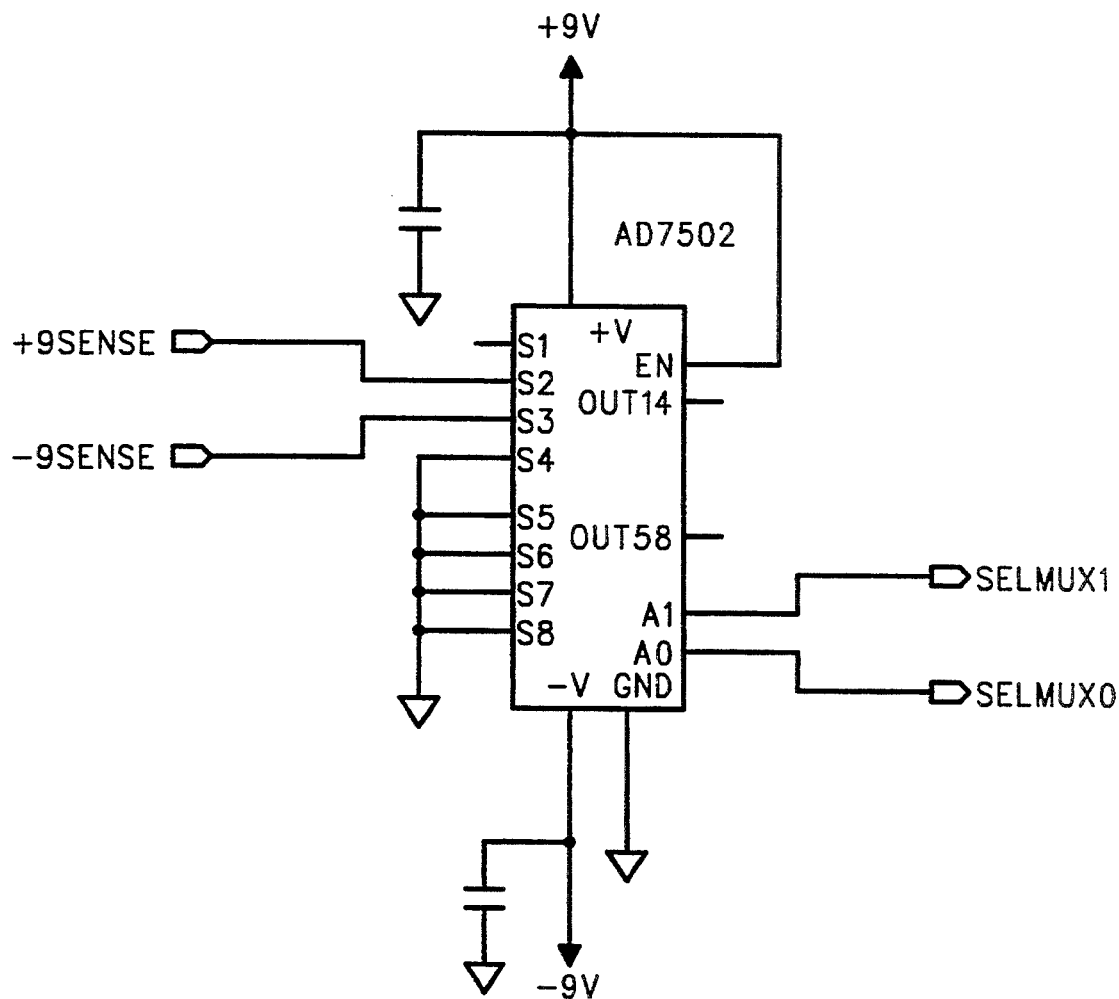

Each MSU preferably includes a high level analog multiplexer 94 (also shown in FIG. 8G). This circuit is preferably of conventional design and allows the microcontroller to select any of three high level voltages (the instrumentation amplifier output and the two battery voltages) for connection to the analog-to-digital converter.

Each MSU preferably contains an analog-to-digital converter circuit 96 (also shown in FIG. 8H) of conventional design. This circuit converts analog voltage levels to binary digital values. Preferably the particular converter used provides self-calibration features and a serial data interface to the microcontroller 98 (also shown in FIG. 8I).

Each MSU preferably includes a microcontroller 98 of a standard configuration known to those of ordinary skill in the art which provides all of the functionality of a small computer. It may also have many digital I/O lines to control other circuitry and provide an RS 232 format input and output for communication with the base-station computer. Software installed in the microcontroller may provide for data processing, communication, and control features needed on each MSU.

Each MSU preferably has unit ID switches 100 (also shown in FIG. 8J). This circuit may contain seven switches connected to the microcontroller which are used to uniquely identify each of the MSU's which may be incorporated in a given kiln monitor system. The unit ID would allow the base-station to address each MSU individually.

Figure 8H:
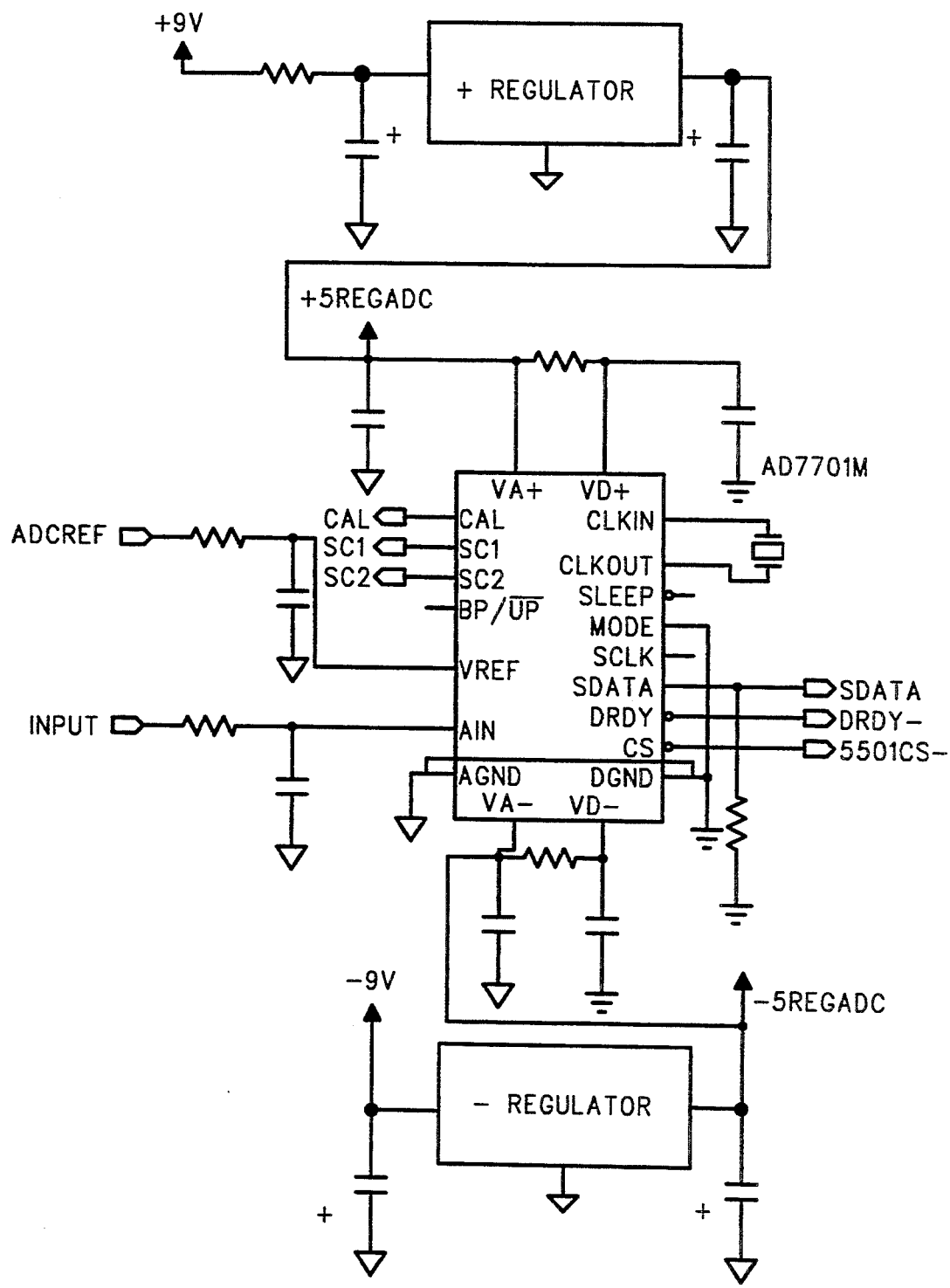

Each MSU would preferably include a home position switch input 80 (also shown in FIG. 8H). This provision is made for the connection of a normally open switch to a microcontroller input. For example, this switch would be closed upon reaching a certain location such as the kiln entrance. This would allow the base-station to establish the position of each MSU that is in service.

Figure 4:
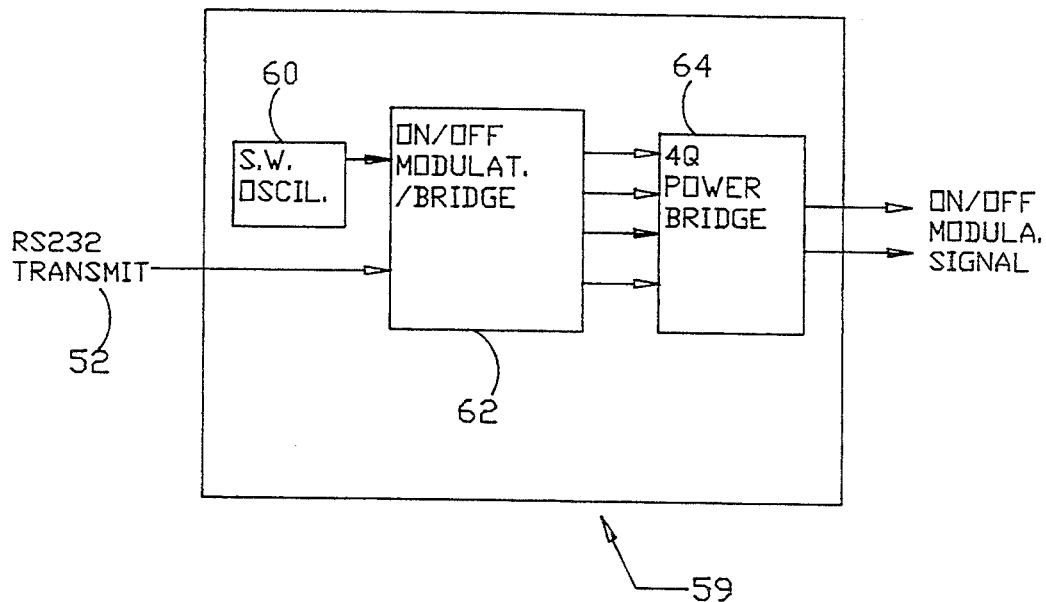
FIG. 4 is a schematic block diagram of a modulator/transmitter of the present invention.
Figure 8L:
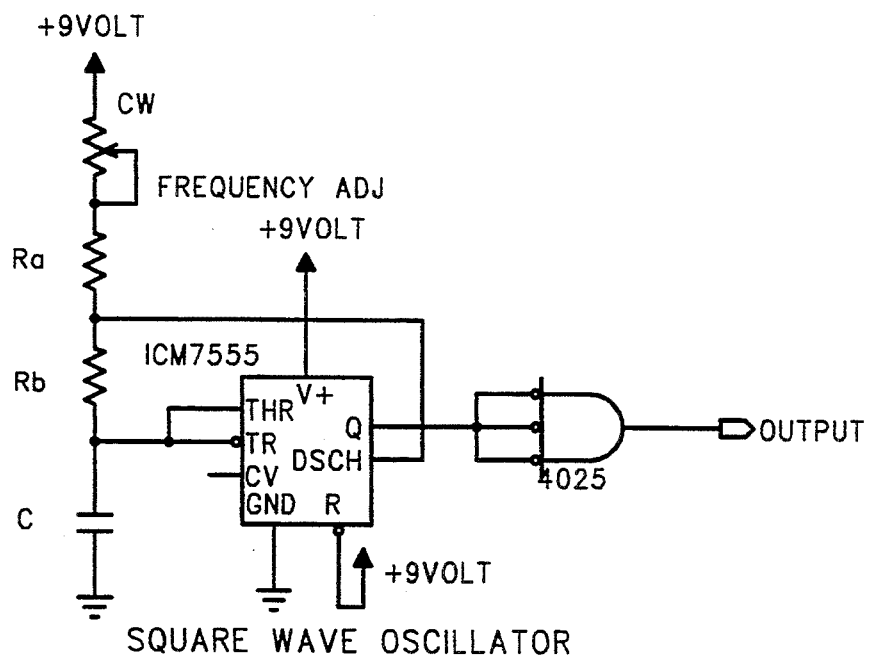
Figure 8M:
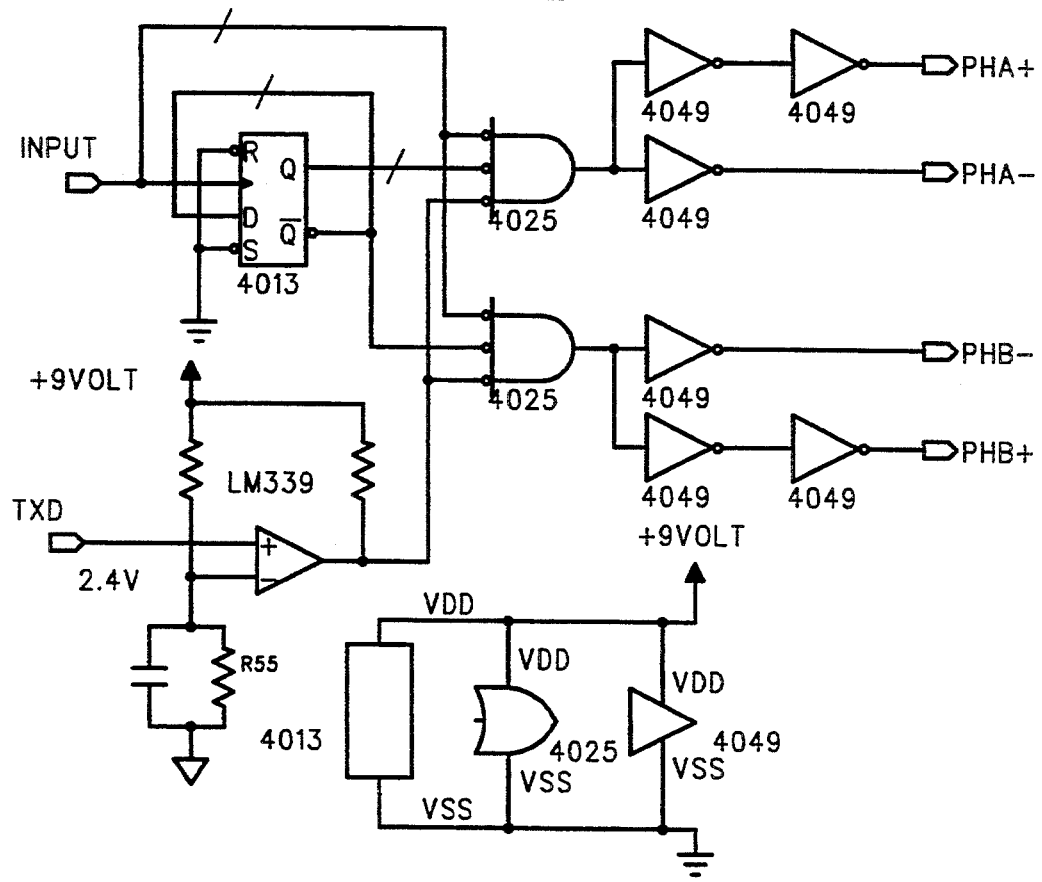
Figure 8N:
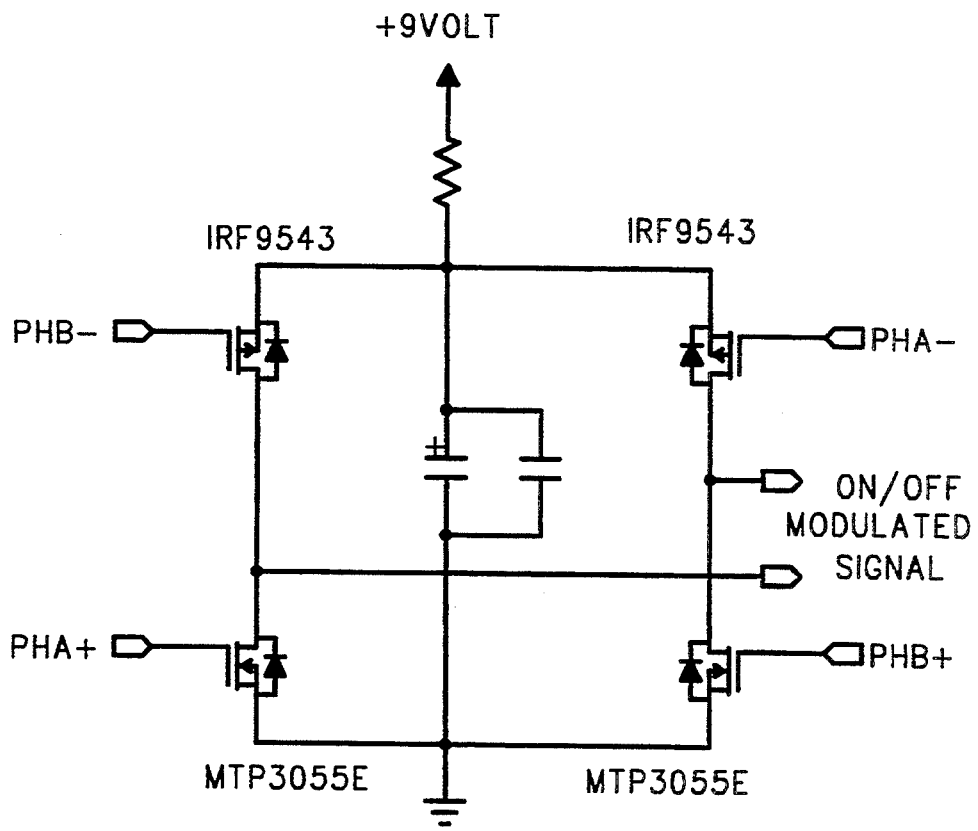

Referring to FIG. 4, each MSU would preferably contain a modulator/transmitter circuit 59. The input to the circuit would be the TTL-level, RS 232-format serial data 52 while the output would be the on-off modulated, RS 232-format serial data 53 to the air-core transformer winding or the impedance matching transformer. This circuit converts the TTL-level, RS 232-format serial data into on-off (amplitude) modulated, RS 232-format serial data, and transmits the resulting signal over the air-core magnetic transformer. Since the serial data is binary, only two amplitudes are needed: on and off (zero volts). The modulation frequency used is preferably approximately 20 kHz. The modulator/transmitter preferably comprises three functional blocks of circuitry. The first is a square wave oscillator 60 of a standard circuit (shown in FIG. 8L) which generates a square wave suitable with a four quadrant power bridge. The second block of circuitry (shown in FIG. 8M) is the on-off modulator/bridge controller 62. When the transmit input is true, this circuit generates control outputs to the four quadrant power bridge 64 which cause it to output a 20 kHz square wave. When the transmit signal is false, the power bridge is set to a high impedance state. The third functional block of circuitry in the modulator/transmitter is a four quadrant power bridge 64. This is a standard circuit (shown in FIG. 8N) generally used in pulse width modulated motor control circuits. It is preferred for this application because of its excellent energy efficiency.

Figure 5:
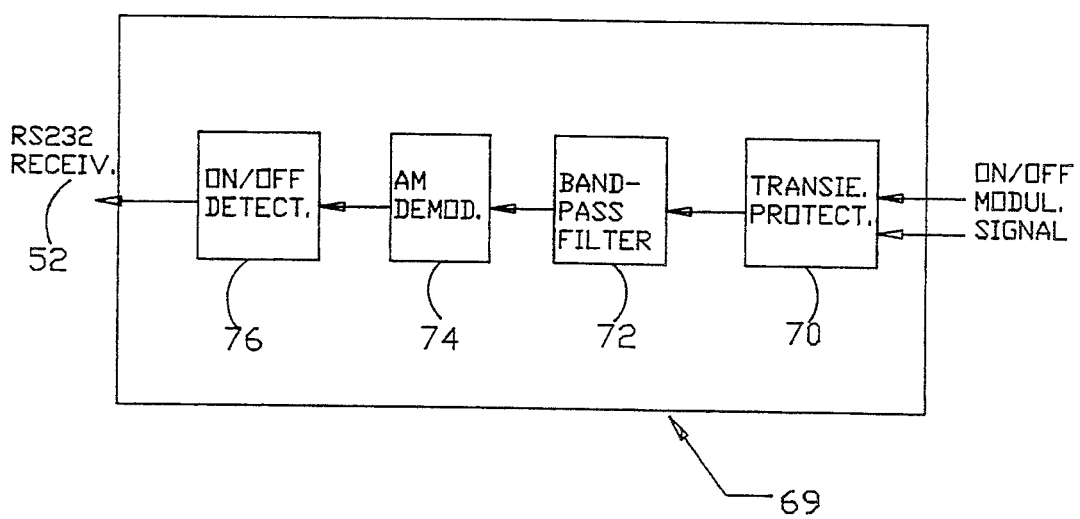
FIG. 5 is a schematic block diagram of a receiver/demodulator of the present invention.
Figure 8O:
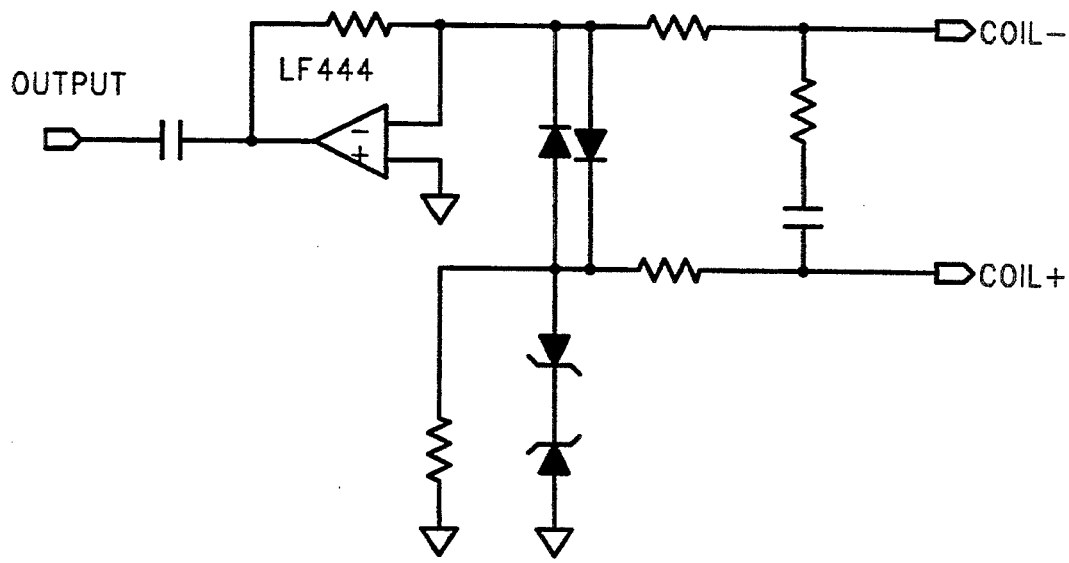
Figure 8P:
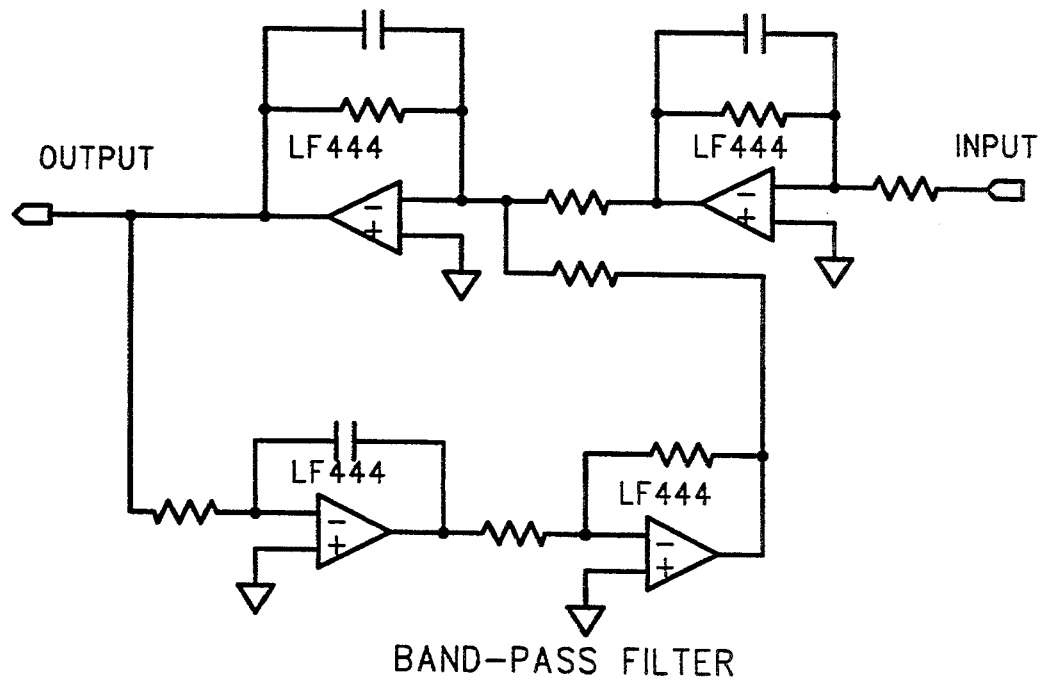
Figure 8Q:
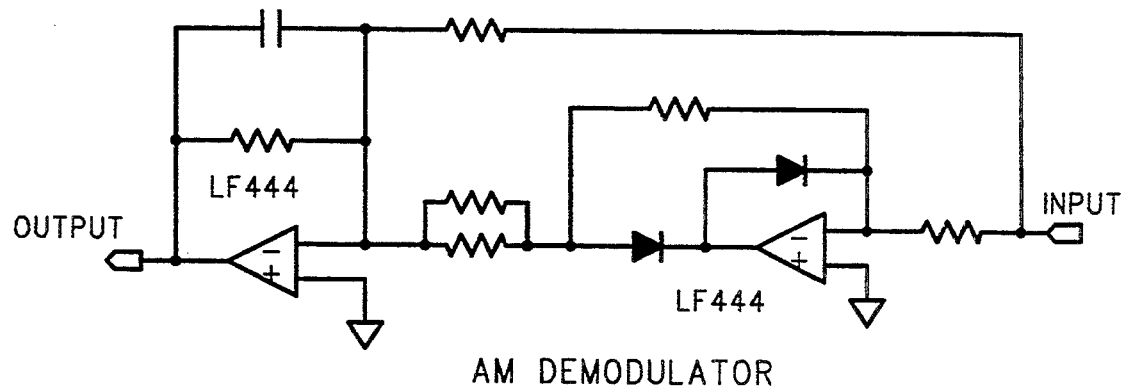
Figure 8R:
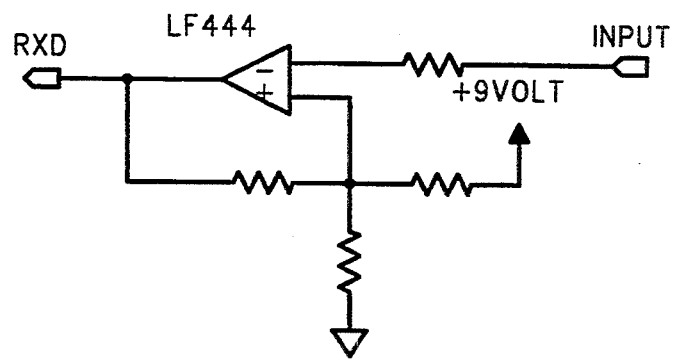

The final preferred functional block of circuitry in each MSU is a receiver/demodulator circuit 69 (shown in FIG. 5). This circuit may have as its input on-off modulated RS 232-format serial data from the air-core transformer winding or the impedance matching transformer 58. Its output would be TTL-level, RS 232-format serial data 52. The receiver/demodulator converts RS 232-format, on-off modulated signals from the air-core transformer (or impedance matching transformer) into RS 232-format, TTn-level signals. It preferably comprises four functional blocks of circuitry. The first is a transient protection circuitry 70 of conventional design (shown in FIG. 8O) which prevents static discharges or other sources of high voltage from damaging the receiver inputs. The second is a band pass filter 72 of conventional design (shown in FIG. 8P) which permits the communication signals to pass through, but blocks all other frequencies (which could otherwise result in interference problems). The third is an AM demodulator circuit 74 of conventional design (shown in FIG. 8Q) which produces an output voltage that is proportional to the amplitude of the incoming signal. Fourth is an on/off threshold detector 76 of conventional design (shown in FIG. 8R) which detects if the amplitude of the incoming signal is large enough to be considered "on". The output of this circuit is at a voltage level compatible with digital logic circuitry.

It should be noted that the foregoing disclosure describes only preferred embodiments of the present invention and that modifications may be made therein without departing from the spirit and scope of the invention. For example, although thermocouples have been discussed in connection with the preferred embodiment, it is possible to incorporate other sensors in a manner similar to that described herein for thermocouples. The system of monitoring temperature and controlling the temperature profile of a kiln may have equal application to other industries. The various circuits described herein and shown in the accompanying drawings are clearly susceptible to modification without departing from the overall function, means, and result of the present invention.

What is claimed is:

1. A kiln monitor system, for a kiln comprising:
   a mobile sensing unit which detects temperature data at various locations within a setting of articles being fired while on a moving carrier in said kiln;
   a communication link employing magnetic coupling for sending signals characterizing said temperature data, to a conductor which conveys said signals to a station outside of said kiln while said setting of articles are being fired;
   a communication circuit at said station outside of said kiln for receiving said temperature data signals and for sending a command signal to said mobile sensor unit; and
   a computer for processing said temperature data, and for generating a human readable output characterizing said temperature data signals signals.

2. The system of claim 1, wherein said mobile sensing unit includes a receiver to receive temperature signals from at least one temperature detecting device; a converter to change said temperature data signals to digital format; and a transmitter to convey said temperature data signals in said digital format to said computer.

3. The system of claim 2, wherein said at least one temperature detecting device is a thermocouple.

4. The system of claim 1, wherein said communication link includes an air-core signal transformer.

5. The system of claim 4, wherein said air-core signal transformer comprises a primary winding connected to said communication link and in proximal association with said kiln, and a secondary winding connected to said mobile sensing unit said primary winding and said secondary winding in a spatial relationship that allows for magnetic energy to link said primary and secondary windings to permit communication therebetween.

6. The system of claim 5, wherein said primary winding comprises a sin single turn loop of wire running substantially parallel to a set of tracks within said kiln on which said carrier is movable.

7. The system of claim 5, wherein said secondary winding comprises a multiple turn winding of wire secured to the underside of said moving carrier.

8. A method for monitoring the interior of a kiln during its operation, said method comprising the steps of:
   providing a movable carrier on which to place articles to be fired in said kiln;
   placing said articles on said movable carrier;
   providing at least one atmospheric condition sensor positioned within or near a setting of said articles on said movable carrier;
   causing said movable carrier to move within said kiln;
   causing said articles to be fired;
   sensing at least one atmospheric condition within said setting of articles on said movable carrier as said setting of articles are fired;
   quantifying said at least one atmospheric condition into transmittable signals;
   transmitting said transmittable signals via magnetic coupling to a conductor which conveys said transmittable signals to a receiving location outside of said kiln; and
   processing said received transmittable signals to generate an output that characterizes said condition(s).

9. The method of claim 8, wherein said transmitting is accomplished by an air core signal transformer arrangement.

10. The method of claim 8, wherein said at least one atmospheric condition include temperature.

* * * * *

UNITED STATES PATENT AND TRADEMARK OFFICE
CERTIFICATE OF CORRECTION

PATENT NO. : 5,416,727
DATED : May 16, 1995
INVENTOR(S) : William B. Shook, et al It is certified that error appears in the above-indentified patent and that said Letters Patent is hereby corrected as shown below:

In column 9, line 44, after the word "data" please insert the word -- signals --.

In column 9, line 46, please replace the words "data signals signals" with the words "data signals".

In column 10, line 16, please delete the word "sin".

Signed and Sealed this

Twenty-ninth Day of August, 1995

Attest:

BRUCE LEHMAN

*Attesting Officer*    *Commissioner of Patents and Trademarks*